(12) United States Patent
Berkeland (10) Patent No.: US 8,893,834 B2
(45) Date of Patent: Nov. 25, 2014

(54) AIRFLOW BAFFLE SYSTEM FOR ARTICULATING HOOD WITH MULTIPLE HINGE LOCATIONS

(75) Inventor: Jerry Edward Berkeland, Waterman, IL (US)

(73) Assignee: Caterpillar Inc., Peoria, IL (US)

( * ) Notice: Subject to any disclaimer, the term of this patent is extended or adjusted under 35 U.S.C. 154(b) by 80 days.

(21) Appl. No.: 13/243,725

(22) Filed: Sep. 23, 2011

(65) Prior Publication Data

US 2013/0074410 A1    Mar. 28, 2013

(51) Int. Cl.
| | |
|---|---|
| *B60K 11/06* | (2006.01) |
| *B62D 25/12* | (2006.01) |
| *E02F 9/08* | (2006.01) |
| *E02F 3/34* | (2006.01) |

(52) U.S. Cl.
CPC .............. *E02F 3/3411* (2013.01); *B62D 25/12* (2013.01); *E02F 9/0891* (2013.01); *E02F 9/0866* (2013.01)
USPC ...................... 180/68.1; 180/68.4; 296/100.09

(58) Field of Classification Search
USPC ..................... 180/68.1, 68.2, 68.3, 68.4, 68.6; 296/100.06, 100.09; 49/490.1, 498.1, 49/499.1
See application file for complete search history.

(56) References Cited

U.S. PATENT DOCUMENTS

| | | | |
|---|---|---|---|
| 3,207,250 A | 9/1965 | Bamford | |
| 4,371,048 A | 2/1983 | Hansen | |
| 6,202,777 B1 | 3/2001 | Surridge | |
| 6,457,543 B1 | 10/2002 | Wooldridge | |
| 7,017,305 B2 * | 3/2006 | Ikuta | 49/498.1 |
| 7,418,994 B2 * | 9/2008 | Evans et al. | 165/41 |
| 7,523,798 B2 * | 4/2009 | Muramatsu et al. | 180/68.1 |
| 7,866,426 B2 | 1/2011 | Umemoto et al. | |
| 7,992,665 B2 * | 8/2011 | Giovannini et al. | 180/69.2 |
| 8,347,994 B2 * | 1/2013 | Bering et al. | 180/68.3 |
| 2004/0216934 A1 * | 11/2004 | Tomiyama et al. | 180/68.1 |
| 2008/0006460 A1 * | 1/2008 | Giovannini et al. | 180/69.2 |

FOREIGN PATENT DOCUMENTS

| | | |
|---|---|---|
| JP | 2010163036 | 7/2010 |
| KR | 1020080046961 | 5/2008 |

* cited by examiner

*Primary Examiner* — John Walters
(74) *Attorney, Agent, or Firm* — Miller, Matthias & Hull (57) ABSTRACT

The present disclosure concerns an airflow baffle system and sealing system which effectively seals an articulating hood, such as for a wheel loader, for more efficient routing of cooling air and exhaust air. The articulating hood may have multiple hinges connecting the hood to the motor vehicle. For example, a rear hinge or set of hinges may allow upward and rearward rotation of the entire hood, while a second set of hinges atop the hood may allow for upward and forward rotation of only a portion of the hood when quicker access to only a portion of the engine compartment is required.

20 Claims, 6 Drawing Sheets

AIRFLOW BAFFLE SYSTEM FOR ARTICULATING HOOD WITH MULTIPLE HINGE LOCATIONS

TECHNICAL FIELD

This disclosure relates to articulating hood assemblies including a first hood that is selectively moveable with respect to a second hood using multiple hinge locations, and in particular to a sealing arrangement for sealing gaps between an articulating hood assembly and an enclosed compartment covered by the articulating hood assembly.

BACKGROUND

Internal combustion engines operate in a variety of environments. No matter what the environment, however, these engines require considerable cooling to remove excess heat generated during operation. Accordingly, most such engines include a cooling package, such as a radiator and a fan, to circulate at least air to cool the engine. Such engines typically use the fan and radiator in combination with a cooling pump that circulates a cooling solution, such as water or a water/antifreeze solution, to internal channels within the engine for cooling. The engines may be mounted in mobile machines, such as highway trucks, off-highway trucks, excavators, tractors, motor graders, wheel loaders, scrapers and the like, operating in environments that include airborne dust and debris.

Because of these challenging situations, in addition to normal maintenance, access is required to the compartment housing the engines and the cooling package. In order to provide convenient access, some compartments now include not merely a single hood, but an articulating hood that allows a user to conveniently and quickly access only a needed portion of the hood without mechanical assistance. Such hoods are described in co-owned U.S. Pat. No. 7,992,665, entitled, "Hood Assembly For a Machine and a Method of Use Thereof." In many cases it may be desirable to provide a seal between the hood compartments.

There are, of course, many ways to seal hoods for an engine compartment. One way is disclosed in U.S. Pat. No. 7,866,426, issued to Hideya Umemoto et al. In this disclosure, elastic seals are mounted to the sides and top of a radiator. When the hood is closed, the top and side seals press between the top of the hood and the sides of the hood to prevent air flow and heat from diffusing from the engine to the radiator. However, the seals are elastic, and being attached directly to the engine, may likely degrade over time and provide less sealing than desired. In addition, the top seals and the side seals do not seal in a continuous plane or continuous sealing surface. Thus, while there will be some sealing of the engine area from the radiator area, it is highly likely that this design will include leaks from the outset, with performance becoming worse as the elastic seals degrade over time.

The present disclosure is directed to overcoming one or more of the problems set forth above and/or other problems of the prior art.

SUMMARY OF THE INVENTION

In one aspect, the present disclosure may be a sealing device, such as a device for channeling incoming cooling air separately from warm exhaust air in an engine compartment having an articulating hood. In one embodiment, there is an articulating hood assembly. The articulating hood assembly includes a stationary sealing element having a left side, a right side and a cross member between the left and right sides, the stationary sealing element having a substantially continuous sealing surface and also includes an articulating hood for mating with the substantially continuous sealing surface of the stationary sealing element, the articulating hood comprising at least two hoods, wherein at least a portion of the articulating hood is moveable in a first direction from the stationary sealing element to an open position and wherein at least a second portion of the articulating hood is moveable in a second direction from the stationary sealing element. The articulating hood assembly also includes a sealing baffle fixed to the articulating hood, wherein a seal is broken and formed between the stationary sealing element and the sealing baffle of the articulating hood when: 1) at least the portion of the articulating hood is moved and returned in the first direction; and 2) at least the second portion of the articulating hood is moved and returned in the second direction, wherein when the sealing baffle is in a closed position, the stationary sealing element forms a substantially continuous seal at an interface between the stationary sealing element and the sealing baffle.

Another embodiment is an articulating hood assembly. The articulating hood assembly includes an engine compartment having a stationary sealing element, the stationary sealing element having a substantially continuous surface and an articulating hood mounted to the engine compartment for mating with the stationary sealing element, the articulating hood comprising at least two hoods, wherein at least a first portion of the articulating hood is moveable in a first direction from the stationary sealing element to an open position and wherein at least a second portion of the articulating hood is moveable in a second direction from the stationary sealing element. The articulating hood assembly also includes a sealing baffle fixed to the articulating hood, wherein a seal is broken and formed between the stationary sealing element and the sealing baffle of the articulating hood when: 1) at least the first portion of the articulating hood is rotated and returned in a first direction; and 2) at least the second portion of the articulating hood is rotated and returned in a second direction, wherein when the sealing baffle is in a closed position, the stationary sealing element forms a substantially continuous seal at an interface between the stationary sealing element and the sealing baffle.

Another embodiment is an articulating hood assembly. The articulating hood assembly includes an engine compartment having a stationary sealing element having a left side, a right side and a cross member between the left and right sides, the stationary sealing element having a substantially continuous top surface in which at least portions of surfaces of the stationary sealing element on opposite sides of the engine compartment lie in a same plane and an articulating hood mounted to the engine compartment for mating with the stationary sealing element, the articulating hood comprising a radiator hood and an engine hood, wherein at least the radiator hood is rotatable in a first direction from the stationary sealing element to an open position and wherein at least the engine hood is rotatable in a second direction from the stationary sealing element. This embodiment also includes a sealing baffle fixed to the radiator hood, wherein a seal is broken and formed between the stationary sealing element and the sealing baffle of the radiator hood when: 1) at least the radiator hood is rotated and returned in a first direction; and 2) at least the engine hood is rotated and returned in a second direction, wherein the sealing baffle includes a stiffer portion for fixing to the articulating hood and a more flexible portion joined to the stiffer portion for mating with the stationary sealing element, wherein when the sealing baffle is in a closed position, the stationary sealing element forms a substantially continuous seal at an interface between the stationary sealing element and the sealing baffle.

Another embodiment is an articulating hood assembly. In this embodiment the articulating hood assembly includes a stationary sealing element having a left side, a right side and a cross member between the left and right sides, the stationary sealing element having a substantially continuous sealing surface and also includes an articulating hood for mating with the substantially continuous sealing surface of the stationary sealing element, the articulating hood comprising at least two hoods, wherein at least a portion of the articulating hood is moveable in a first direction from the stationary sealing element to an open position and wherein at least a second portion of the articulating hood is moveable in a second direction from the stationary sealing element. The articulating hood assembly also includes a sealing baffle fixed to the articulating hood, wherein a seal is broken and formed between the stationary sealing element and the sealing baffle of the articulating hood when: 1) at least the portion of the articulating hood is moved and returned in the first direction; and 2) at least the second portion of the articulating hood is moved and returned in the second direction.

Another embodiment is an articulating hood assembly. The articulating hood assembly includes an engine compartment having a stationary sealing element, the stationary sealing element having a substantially continuous surface and an articulating hood mounted to the engine compartment for mating with the stationary sealing element, the articulating hood comprising at least two hoods, wherein at least a first portion of the articulating hood is moveable in a first direction from the stationary sealing element to an open position and wherein at least a second portion of the articulating hood is moveable in a second direction from the stationary sealing element. The articulating hood assembly also includes a sealing baffle fixed to the articulating hood, wherein a seal is broken and formed between the stationary sealing element and the sealing baffle of the articulating hood when: 1) at least the first portion of the articulating hood is rotated and returned in a first direction; and 2) at least the second portion of the articulating hood is rotated and returned in a second direction. The first direction may be different from the second direction.

Another embodiment is an articulating hood assembly. The articulating hood assembly includes an engine compartment having a stationary sealing element having a left side, a right side and a cross member between the left and right sides, the stationary sealing element having a substantially continuous top surface in which at least portions of surfaces of the stationary sealing element on opposite sides of the engine compartment lie in a same plane and an articulating hood mounted to the engine compartment for mating with the stationary sealing element, the articulating hood comprising a radiator hood and an engine hood, wherein at least the radiator hood is rotatable in a first direction from the stationary sealing element to an open position and wherein at least the engine hood is rotatable in a second direction from the stationary sealing element. This embodiment also includes a sealing baffle fixed to the radiator hood, wherein a seal is broken and formed between the stationary sealing element and the sealing baffle of the radiator hood when: 1) at least the radiator hood is rotated and returned in a first direction; and 2) at least the engine hood is rotated and returned in a second direction, wherein the sealing baffle includes a stiffer portion for fixing to the articulating hood and a more flexible portion joined to the stiffer portion for mating with the stationary sealing element.

DETAILED DESCRIPTION

Figure 1:
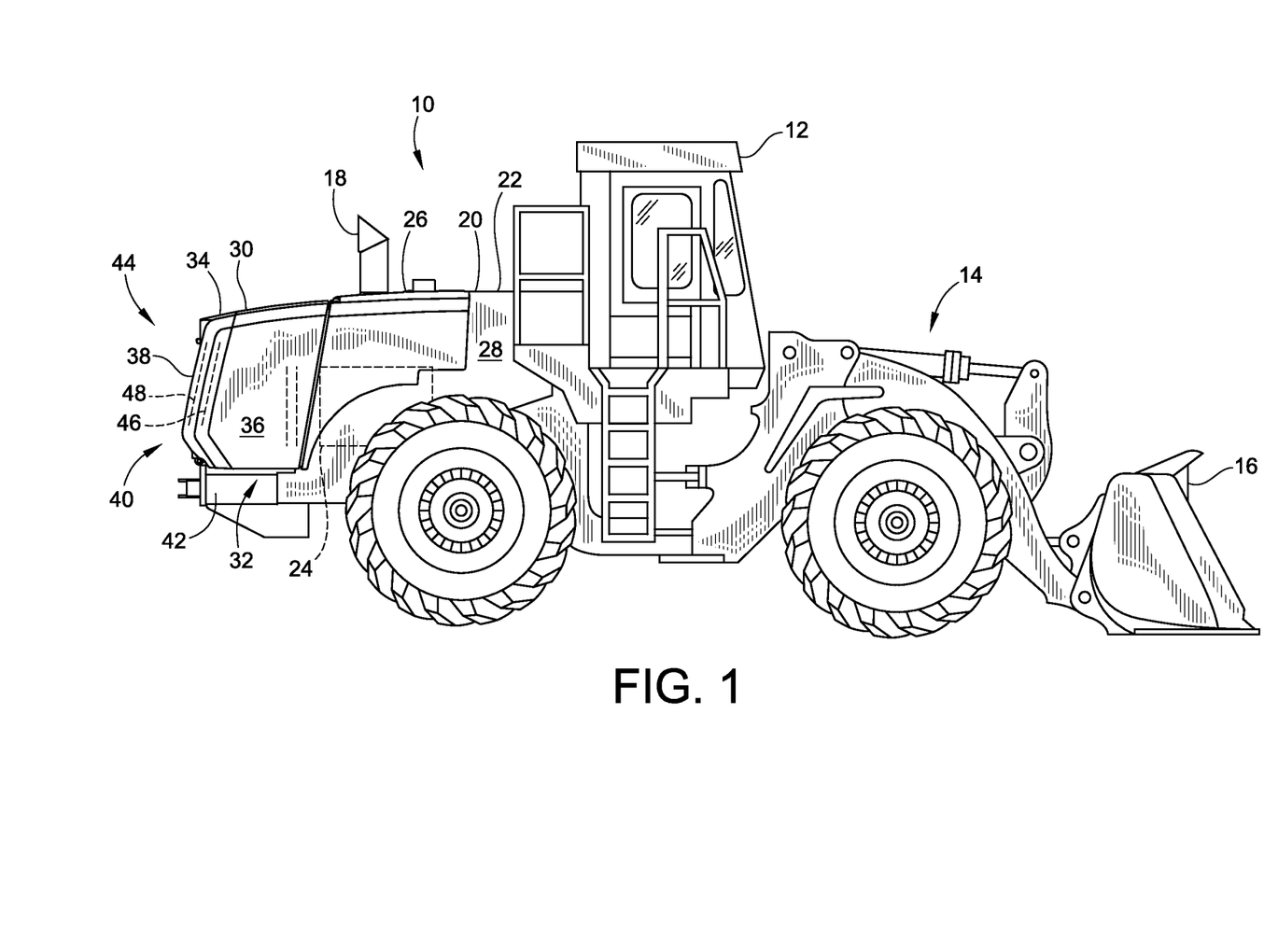
FIG. 1 is a schematic side view of a wheel loader with an articulating hood and an airflow baffle system for the engine compartment.

An industrial machine, such as a wheel loader, may benefit from an articulating hood and the airflow baffle system disclosed herein. FIG. 1 depicts a wheel loader 10 with an operator cab 12, linkage 14 and work implement or bucket 16. The rear portion of the wheel loader includes an engine compartment 22 with an engine 24, exhaust stack 18 and an engine hood 20. The engine hood includes a top panel 26 and one or more side panels 28. To the rear of the engine 24, the wheel loader includes a radiator hood 30 and a cooling package 32. The cooling package includes all the accessories necessary for the cooling of equipment of the wheel loader, including a fan, one or more radiators, heat exchangers and so forth. It is this cooling package that requires a steady inflow of ambient air for cooling and a steady outflow of warm exhaust air, away from the intake, exhausting air that has been heated by exchanging heat with the cooling package.

Figure 3:
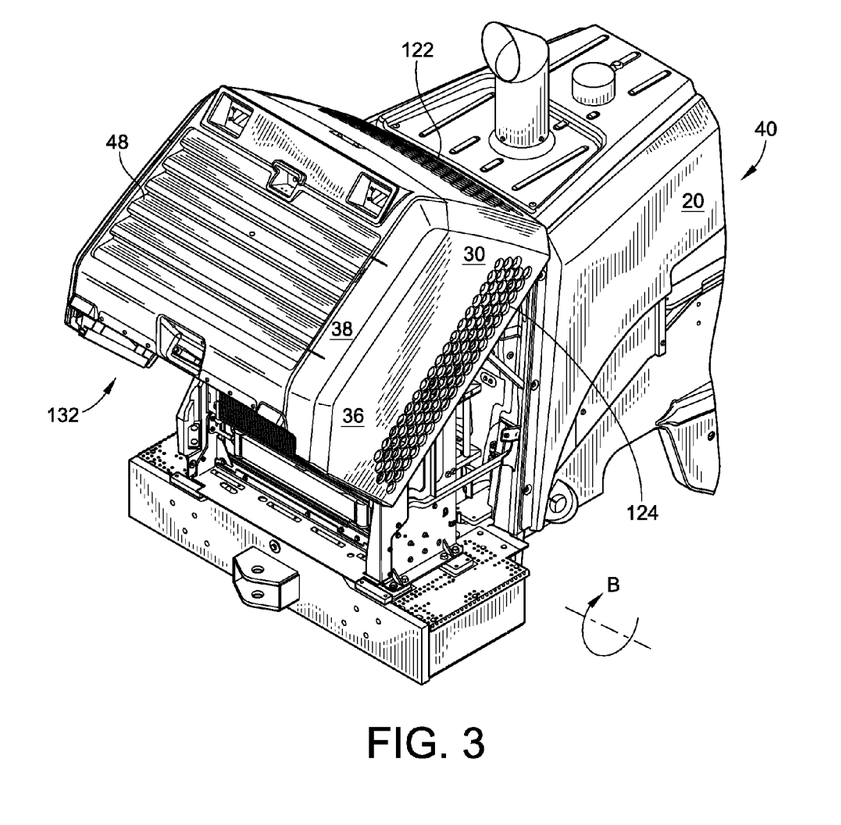
FIG. 3 is a perspective view of an exemplary articulating hood of FIG. 1, a portion of the hood articulated in a second direction.
Figure 4:
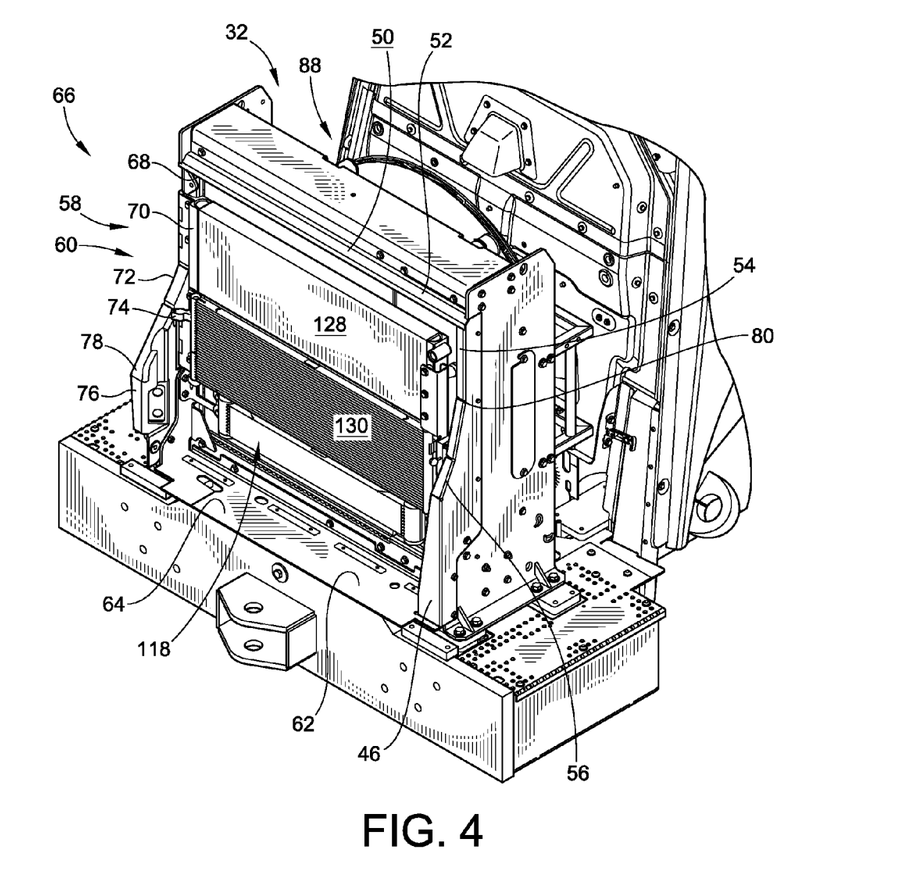
FIG. 4 is a schematic, perspective view of an exemplary disclosed sealing element and surface of the engine compartment of FIG. 1.
Figure 5:
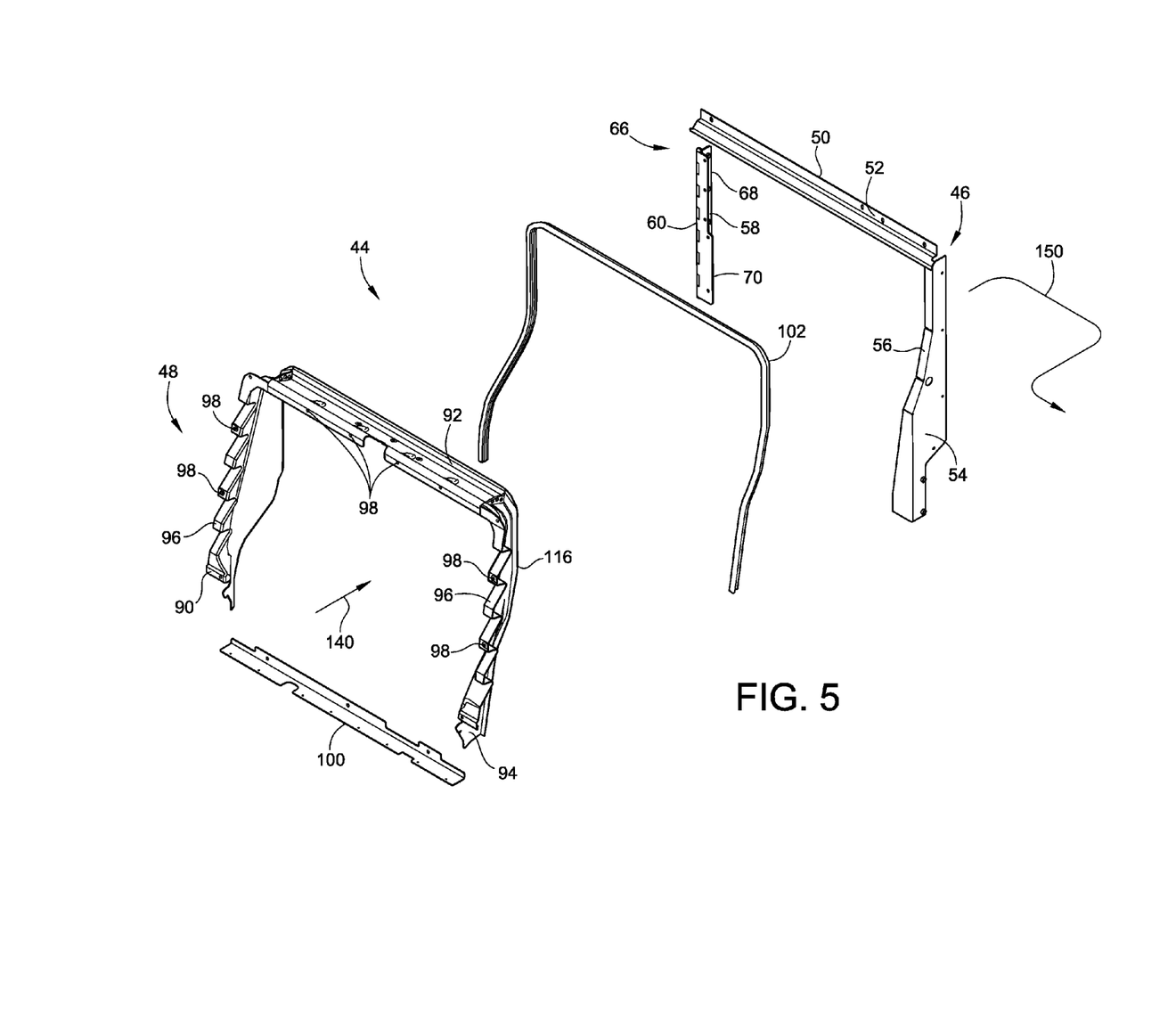
FIG. 5 is an exploded, schematic perspective view of an exemplary disclosed airflow baffle system of FIG. 1.

In one exemplary aspect, this disclosure is directed to a sealing device, shown and described in FIGS. 2-5, for a machine such as that shown in FIG. 1. Referring to FIG. 5, the device generally includes a stationary box-type sealing element 46 affixed to the frame 42 of the machine and a moveable baffle 48 configured to mate with a sealing surface 66 of the stationary sealing element, which may be further provided a bulb seal 102 associated with the baffle.

Figure 2:
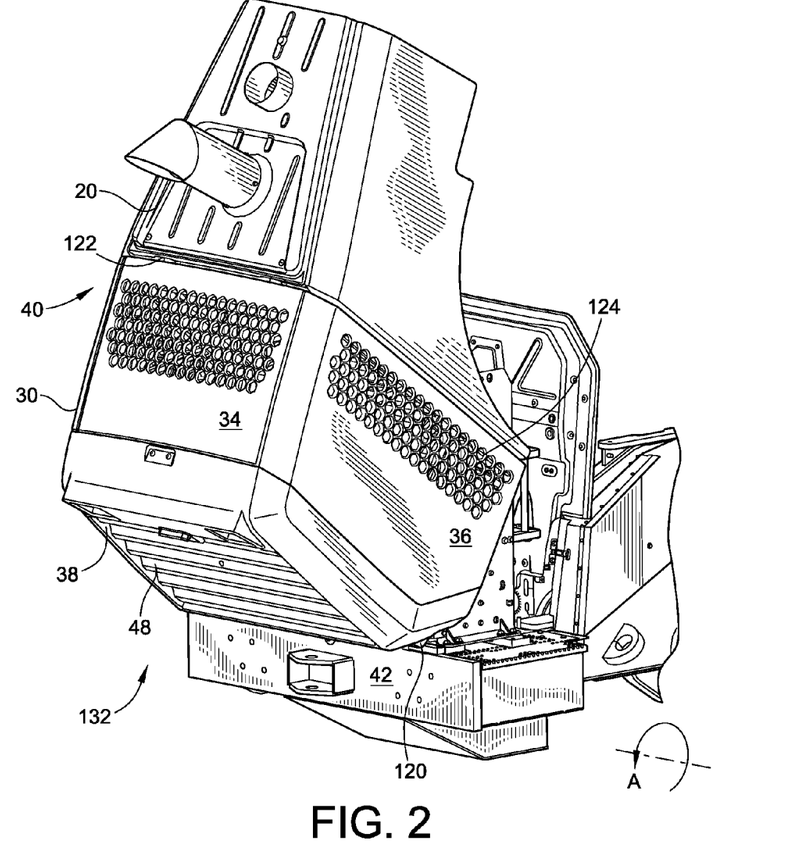
FIG. 2 is a perspective view of an exemplary disclosed articulating hood of FIG. 1, the hood articulated in a first direction.

As shown in FIGS. 1-3, a wheel loader 10 with a multi-directional articulating hood 40 has first and second hoods 20, 30 and a sealing baffle 48 fixed to the articulating hood. As shown in FIG. 4, first hood 20 of articulating hood 40 is moveable in a first direction from the stationary sealing surface from a first position where the articulating hood forms a seal with stationary sealing element 46 to a second position where the articulating hood is in an open position allowing an operator access to the engine compartment. Further, As shown in FIG. 2, the articulating hood itself 40 is moveable in a second, different direction from the stationary sealing surface, from a first position where the articulating hood forms a seal with stationary sealing element, to a second position where the articulating hood is in an open position allowing an operator to access components within the articulating hood.

Sealing element 46 is preferably formed as a component having a substantially continuous surface so that when sealing baffle 48 (attached to first hood 20) is in the closed position, sealing element 46 advantageously forms a substantially continuous seal at the sealing element 46 and baffle 48 interface. In this way, the disclosed sealing device serves to separate the incoming cooling air from the warmed exhaust air, thus enhancing the cooling efficiency of the equipment in which the disclosed sealing device is used as described below. In addition, the substantially continuous seal provided by sealing element 46 serves as the sealing surface for both the first and second hoods of the articulating hood which may reduce the cost of the airflow baffle system while providing increased cooling efficiency as described below. The placement of a flexible bulb seal 82 along the surface of seal baffle 48 that mates with sealing element 46 provides improved sealing efficiency for further increasing the cooling efficiency as described below.

The wheel loader also includes a perforated radiator hood top panel 34, one or more perforated radiator hood side panels 36 and a radiator hood rear panel 38. An airflow baffle system 44 includes a stationary sealing element 46 and a sealing baffle 48. The sealing baffle 48 may be mounted on rear panel 38, covered by the radiator hood 30. Engine hood 20 and radiator hood 30 together form an articulating hood assembly 40, generally described as an articulating hood. Additional details of the articulating hood are disclosed in co-owned U.S. Pat. No. 7,992,665, discussed above.

As explained in this disclosure, an articulating hood enables the user to more easily access the cooling package 32, for example, for cleaning or other maintenance. The radiator hood 30 is situated to the rear of engine hood 20. Radiator hood 30 is secured to the wheel loader frame 42 via a first set of hinges 120 mounted near the bottom and rear of radiator hood 30, as seen in FIG. 2 below. The engine hood 20 is secured to the radiator hood 30 by a second set of hinges 122 mounted atop the hood assembly 40, as seen in FIG. 3 below. Thus, the radiator hood is hingedly connected to the frame and may rotate in a vertical plane about the first set of hinges 120. The engine hood is hingedly connected to the radiator hood and may also rotate in a vertical plane about the second set of hinges 122.

Using these hinges, an operator can rotate the entire hood or only a portion, as described below. These options allow more efficient operation of the equipment. For example, an operator desiring access to only the rear portion, the cooling package, can more easily open the radiator hood alone by simply rotating the hood using the first hinged connection, without requiring a mechanical actuator or other assistance. It is easier to rotate the radiator hood alone rather than the entire hood assembly because the radiator hood is smaller and weighs less than the entire assembly. Of course, for best operation of the device and its cooling package, the hoods should seal properly when they are closed.

This sealing system may have a variety of applications. Some desirable characteristics of the sealing system are depicted in FIGS. 2-3 of the present disclosure. As seen in FIG. 2, a motor vehicle, such as a wheel loader 10, may have an articulating hood assembly 40 including an engine hood 20 and a radiator hood 30. In this embodiment, the radiator hood 30, with cooling holes 124 providing a warm exhaust air outlet, is mounted to frame 42 via a first hinge or set of hinges 120, while the engine hood 20 is mounted to the radiator hood 30 via a second hinge or set of hinges 122. The entire articulating hood assembly 40 may be rotated forwardly via the first or front set of hinges 120. Rotation takes place in a vertical plane, thus separating stationary sealing element 46 (barely visible in this view) from movable sealing baffle 48. Because the sealing baffle 48 forms as nearly a single, continuous surface as possible, there are no independently-moving seal parts to interfere with the movement or rotation of the hood. Radiator hood rear panel 38 includes an inlet grille 132 to admit cooling air via the baffle system for cooling as described.

When the vehicle is first assembled, and all parts have dimensional integrity, opening the radiator hood 30, as shown in FIG. 2, will present little difficulty. Over time, however, parts such as portions of the perforated radiator hood top and side panels 34, 36 may become warped or bent. In some situations, opening or closing the articulating hood assembly may cause unexpected stresses on the sealing baffle 48 and bulb seal 102. These components should have strength to resist additional compressive and flexural stresses that may result from bending or warping of the hood components. This also holds true for the situation described in FIG. 3 below, when only the radiator hood is opened.

As shown in FIG. 3, the articulating hood 40 may be moved or rotated from the open position of FIG. 2 to a closed position, followed by opening only the radiator hood 30. Radiator hood 30 is opened or closed by rotation about top hinge or hinges 122. Rotation of the hood is also in a vertical plane, very similar to the vertical plane in which the entire hood assembly 40 was rotated about hinges 120. Within the limits of manufacturing and assembly tolerances, the planes of rotational direction are the same, that is, to the extent that longitudinal axes of the hinge sets 120, 122 are parallel, the planes of the direction of rotation are the same.

As seen in FIG. 3, rotation of the radiator hood alone moves the sealing baffle 48 apart from the sealing element 46, of which the sealing member top or cross piece 50 is visible in FIG. 3. The rotations or openings depicted in both FIGS. 2 and 3 require movement and rotation of radiator hood 30. Both rotations are in a vertical plane, and within the limits of tolerances, the planes are the same. However, the rotations center about different pivot points, i.e., different locations of hinges 120, 122. Thus, in the movement depicted in FIG. 2, the radiator hood 30 and the entire articulating hood 40 pivots in a counterclockwise direction, see arrow A, about the lower or radiator hood hinges 120. In FIG. 3, only the radiator hood 30 pivots, rotating about upper or engine hood hinges 122. The direction of rotation is clockwise, as seen in arrow B.

In order for repeatable sealing upon closing, the hoods should open and close with minimal interaction between the moveable hoods and the stationary or nonmoving portions of components from the cooling system and within the engine compartment. When the radiator hood 30 or articulating hood 40 opens in FIG. 2, the bottom portion, nearer hinges 120 rotates and moves the shortest distance, while the top portion, near sealing element cross piece 50, will move the greatest distance. Accordingly, good sealing will require the sealing baffle 48 to disengage from the sealing surface 46, top portion first, with minimal interaction or interference between these portions. In the same way, when the radiator hood 30 opens in FIG. 3, the top portion of the radiator hood, nearer top hinges 122, will rotate and move the shortest distance, while the bottom portion, now disengaged from bottom hinges 120, will rotate and move the greatest distance. In this instance, the bottom portion of the sealing baffle, away from the top portion, will disengage first, desirably with minimal interaction and interference caused by the movement. This is facilitated by sealing element 46 having a substantially continuous surface, and is greatly aided if the sealing baffle 48 forms a substantially continuous interface with sealing element 46.

As shown in FIG. 4, the cooling package 32, including fan 88 and one or more radiators 118, is situated to the rear of the engine compartment 22, along with the sealing element 46. In this example, radiators 118 may include the hydraulic cooling radiator 128 and air-conditioning condenser 130. The sealing element 46 is near the rear of compartment 22 which holds the engine and the cooling package. The sealing element may include fabricated metal pieces, as shown, which together form a sealing element 46 with a sealing element surface 66. The metal pieces include sealing member cross piece 50, sealing member right side 52 and sealing member left side 54. In an embodiment, bottom sealing member 62 may also be a portion of sealing element 46. Each of these elements has a visible rearward facing surface intended for use as a sealing surface. These include cross piece top surface 52, right side sealing surface 56, left side sealing surface 60 and bottom member surface 64.

As seen in FIG. 4, it is very difficult to achieve a perfect sealing surface, because the metal pieces used may include gaps 80. In an example, right side sealing member 54 may be fabricated, as well as the other sealing surface pieces, from sheet metal, such as 10-12 ga steel. In a manufacturing environment, these pieces may be blanked with metal removed as shown, forming gaps 80, in order to bend the pieces to the desired shape in a brake press or other standard fabricating machinery. Thus, the sealing surface may have gaps.

In addition, it may not be practical in an existing design to have a single fabricated piece per side, such as the right side, and instead a plurality of pieces may be used, as shown for the left side. Thus, the sealing member left side 58 may be made from a plurality of pieces, 68, 70. In this embodiment, the sealing surface 66 also includes a top surface 78 of a hydraulic line bulkhead 76. Even though the sealing surface 72, 74 provided by these elements may have gaps, the sealing surface should be as continuous as possible so that when sealing baffle 48 is in the closed position, sealing element 46 advantageously forms a substantially continuous seal at the interface between the sealing element 46 and the sealing baffle 48. As seen in FIG. 4, this may be achieved using elements that are adjacent or contiguous, or at least as close to contact as possible. This may be difficult because of the design constraints that arise from adapting an existing piece of equipment or end item, such as a wheel loader or new model of wheel loader in which some portions of an existing configuration may be used. The sealing element 46 of FIG. 4 and FIG. 5 is stationary and is intended to mate with the moveable seal or sealing baffle depicted in FIG. 5.

Airflow baffle system 44, as depicted in the exploded view of FIG. 5, includes the stationary sealing element 46 and the mating seal or sealing baffle 48 which may include bulb seal 102 between the sealing element and the sealing baffle, as shown. As noted above, the stationary sealing element may include several pieces, or may include a single piece. Even a single side of the sealing element may be made from several separate pieces that are not joined together to form an assembly, but instead are assembled as close together as possible in the compartment, so as to make as continuous a sealing surface as possible. Also depicted in FIG. 5 is bulb seal 102, which is intended for attachment to sealing baffle 48 and which forms the primary seal between the sealing element 46 and the sealing baffle 48. The incoming cooling air (indicated by arrow 140) is intended to enter from the left in the view of FIG. 5, in the center of the baffle structure, while the warmed exhaust air (indicated by arrow 150) is intended to leave via the cooling holes 124 of the perforated side and top panels 34, 36 outside the baffle structure, as described above and shown in FIGS. 2-3. It will be appreciated from the disclosure that the disclosed sealing device serves to separate the incoming cooling air from the warmed exhaust air, thus enhancing the cooling efficiency of the equipment in which the disclosed sealing device is used.

When the radiator hood and the articulating hood are closed, the bulb seal 102 will provide the engagement between the sealing element and the sealing baffle. Thus, bulb seal 102 will be strongly adhered to the sealing baffle to resist detachment upon opening. Different parts of the bulb seal are subjected to stress depending on which portion of the hood is opened or closed. When the radiator hood only 30 is opened, the lower portions of the sealing baffle and the bulb seal, as shown in FIG. 5, will move first. Thus, it is important that the bulb seal resist adhering to the sealing surface, and that the bulb seal is sufficiently strongly attached to the sealing baffle to maintain its integrity. When the engine hood or articulating hood 40 is opened, the top portions of the sealing baffle and bulb seal will move first. In this instance, resistance to adhering between the sealing surface and the sealing baffle is also important, since sealing element cross piece or top 50 may provide a convenient shelf for accumulation of dirt and debris that may cause some adhesion between the sealing surface and portions of the baffle.

Sealing baffle 48 may be fabricated from several pieces, as shown, and assembled into a sealing baffle assembly. Alternatively, the components of the sealing baffle may be mounted individually to the moveable piece which they are intended to seal. In one embodiment, sealing baffle 48 includes a left side baffle 90, a top baffle 92 and a right side baffle 94. The sealing baffle may also include a bottom portion 100. Bottom portion 100 may be similar in construction to the other baffle components, or it may take the form of a gasket along the bottom of the radiator hood rear panel 38. The rear-facing surfaces of the baffle components, as shown in FIG. 5, are intended to mate with the radiator hood rear panel 38, as shown in FIG. 1. Consequently, these portions are fabricated so that they form a good fit with the rear panel. In this example, the left and right sides of the baffle each include a plurality of convolutions 96 or curved portions intended to fit into mating portions of the radiator hood rear panel. The convolutions are on a first side of the baffle and away from the opposite side or second side of the baffle, the side intended for mating with a stationary sealing element/sealing surface. As also seen in FIG. 5, there may be one or more orifices 98 in the individual convolutions. These orifices may be used with fasteners, e.g., bolts (not shown), to secure the baffle components to the radiator hood rear panel.

The pieces of the baffle may be made from fiberglass, e.g., a suitable organic resin reinforced with a suitable proportion of glass fibers. In one embodiment, the fiberglass pieces may be molded separately, in a liquid compression molding process, with 20-30% glass content. In other embodiments, the pieces may be fabricated via resin transfer molding, reinforced resin injection molding, and so forth. Suitable resins include polyester, vinyl ester and epoxies. Thermoplastics and suitable processes may also be used. Orifices suitable for assembly may be molded into the pieces or added by secondary processing.

Figure 6:
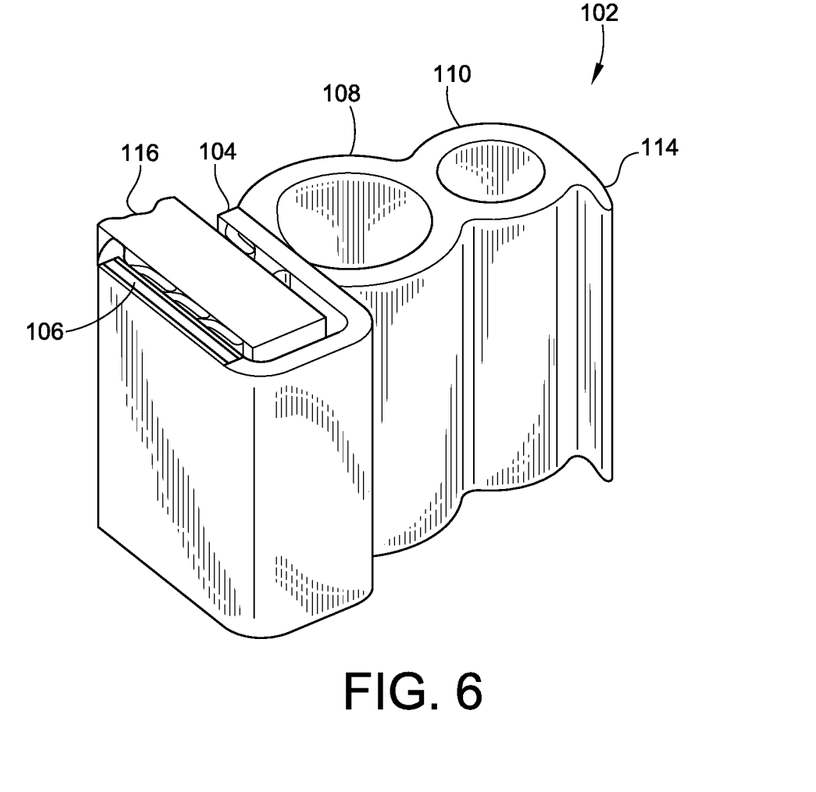
FIG. 6 is a partial cross section of an exemplary bulb seal as depicted in FIG. 5.

The bulb seal attaches to the sealing baffle to form the actual sealing interface between the baffle on the rear panel and the sealing surface described above. As seen in FIG. 6, bulb seal 102 has a distinctive cross section suitable for attachment to the sealing baffle and also suitable for sealing against the stationary sealing surface. The portion of the bulb seal closest to the sealing baffle, and which attaches to the sealing baffle, may be described as a U-shaped channel 104, with the open end of the U intended to accept an extension or protrusion 116 of the sealing baffle. In one embodiment, the channel 104 may have an inner dimension of about 3-5 mm, with the protrusion 116 of the sealing baffle having a suitable mating dimension, of about 2-4 mm. Other dimensions may be used for this or other applications.

Fiberglass protrusion 116 may be joined to channel 104 of bulb seal 102 by adhesive bonding or by any other suitable method, such as solvent bonding, heat bonding, or a suitable mechanical method. The channel portion 104 of the bulb seal may also have a reinforcement 106, such as a thin ribbon of steel, to add rigidity along the length of the channel. The rigidity may facilitate joining of the channel and bulb seal to the sealing baffle. In one embodiment, the reinforcement is placed in the portion of the channel closer to the sealing baffle, as opposed to the side closer to the secondary seal. The dimension of the bulb seal in the direction of sealing is about 3 cm, e.g. about 30 mm. Other dimensions may be used for this or other applications.

Secondary seal 108 may have a cross section in a shape of a hollow cylinder. In one embodiment, secondary seal 108 may have an outer diameter of about 14-20 mm and in inner diameter of about 8-14 mm. Primary seal 110 may have a cross-section of a hollow cylinder. In one embodiment, the cylinder has an outer diameter of about 10-12 mm and an inner diameter of about 6-8 mm.

In one embodiment the channel is made from solid rubber. Suitable materials include EPDM, nitrile, polyurethane, styrene-butadiene rubber (SBR). Other suitable elastomers, including thermoplastic elastomers, may be used. Other portions of the bulb seal include the secondary seal portion 108, the primary seal 110 and retainers 114 on both sides of the bulb seal. The retainers may be a thin continuous ribbon in one embodiment, and may be from 2-4 mm thick (about 0.075 inches to about 0.160 inches thick). In another embodiment, they may be discrete individual retainers, such as thin cylinders, squares or rectangles. These portions may be made of closed cell sponge rubber, e.g., closed cell foamed rubber. Suitable materials may include EPDM and polyurethane foams. Other suitable materials may be used. To fabricate the bulb seal, an extrusion process may be used to form a long continuous bulb seal that is cut-to-length for the application. Other methods may be used to fabricate a discrete length at a time.

Industrial Applicability

The sealing system described in the present disclosure is useful in achieving better cooling in motor vehicles. It also may aid cooling in other applications in which an engine or other heat generating device requires cooling. As seen in FIGS. 1 and 2, the engine 44 is located forward of the cooling package, which may include a fan 88 nearer the engine and one or more radiators 118. In this configuration, the engine is cooled by the fan and the radiator, and the direction of air flow may be forward, that is, air is drawn by the fan through an inlet grill of the radiator hood rear panel and forced forward through the radiators. This is shown by cooling air drawn forward as indicated by arrow 140 in FIG. 5. The air that has passed through the radiators will be warm exhaust air which is desirably forced outside the baffle structure and out through cooling or ventilation holes on the sides of the engine compartment, as indicated by arrow 150 in FIG. 5. By limiting the flow of air through first the radiator, then through the fan, and then out of the compartment, a flow pattern is set, in which the fan draws cooler air from the grille in the rear of the engine compartment and then exhausts it through the cooling holes on the sides and top.

Cooling is enhanced if the cooling air drawn by the fan is cool air, cooler and denser air, the cooler the better, rather than warm air. The primary goal of the sealing system described herein is to prevent flow of the warm exhaust air rearward, thus mixing the warm exhaust air with the cool incoming air and warming, at least to some extent, the air drawn in by the fan and forced through the radiators and out through the exhaust area provided by the left and right side cooling holes or perforations. Preventing this leakage by directing the exhaust air away from the intake may also lead to more efficiency of the fan, thus leading to higher air flow in the desired direction and greater cooling. In one embodiment, this may result in a lower temperature rise in the cooling system. As a consequence, required fan speeds may be lower, and less radiator surface area may be required—i.e., a smaller cooling package may be required. This may result in a more efficient vehicle or other component, such as a vehicle, an engine, or an electrical generator that uses such an engine, with greater efficiency or greater fuel economy.

The utility is not in providing cooling air, which is typically available, but in directing the exhaust air away from the incoming cool air. Of course, a vehicle may also have many other duties and requirements. Thus, the articulating hood described above may be useful in a variety of other enclosures, such as highway trucks, off-highway trucks, excavators, tractors, motor graders, wheel loaders, scrapers, and mobile power plants, which may include a packaged diesel engine used to power an electrical generator. Other uses may include trailer-mounted or skid-mounted devices, such as portable compressors or generators, in which the package includes an internal combustion engine that requires cooling. These applications may find two hoods useful for a variety of reasons, but easy, convenient access to the equipment without completely opening the engine compartment is usually one of the reasons.

In computational fluid dynamics (CFD) calculations, the improved sealing resulted in 12% increase in air flow through the radiator. Since the amount of air moved is in direct proportion to the speed of the fan, and the speed of the fan was not changed, this may amount to a 12% increase in air flow for the same fan speed. Alternatively, the fan speed may be lowered 12% for the same air flow. In one embodiment, the improved sealing technique had a BSFC (brake specific fuel consumption) improvement of 11% during machine operation at maximum fan speed. Alternatively, the increased air flow may be used to lower the inlet air-to-core temperature rise of the cooling package, e.g., by about 3-5° F. (about 2-3° C.). Of course, if a lower fan speed with increased efficiency provides sufficient cooling, the power required would be reduced proportionally.

It should be understood that the above description is intended for illustrative purposes only, and is not intended to limit the scope of the present disclosure in any way. Thus, those skilled in the art will appreciate that other aspects, objects, and advantages of the invention can be obtained from a study of the drawings, the disclosure and the appended claims. For example, although the embodiments disclosed include two hoods joined to a compartment with two hinges, other embodiments may have more than two hoods, or may be joined to a compartment with more than two hinges. For example, an auxiliary door may also use the same sealing surface.

Portions of the sealing surface on opposite sides of the engine compartment have been described as lying at least partly in a plane. Those skilled in the art will recognize that this is merely an approximation. The planar portion on each side of a real engine compartment does not form a perfect geometric plane, but merely an approximation. The combination of both sides forms an even less-perfect plane, and thus the description that portions of both sides of the sealing surface lie in a same plane is an approximation. The rotation or opening of the hoods is described as taking place in a vertical plane. Those skilled in the art will also recognize that a hood is three-dimensional and cannot occupy a mere plane; what is intended is that the direction of rotation of the radiator hood takes place in a vertical plane, i.e., up and down, rather than left and right in a horizontal plane. The direction of rotation of the articulating hood also takes place in a vertical plane, which is described as being the same plane as the direction of rotation of the radiator hood. This is also an approximation, in that real assemblies and real hinges have tolerances and are not perfect. The direction of rotation of the two takes place in approximately the same plane.

It will be apparent to those skilled in the art that various modifications and variations can be made to the disclosed airflow baffle sealing system. Other embodiments will be apparent to those skilled in the art from the consideration of the specification and practice of sealing and gasketing, for example by making the fiberglass baffle and bulb seal as an integral assembly. It is intended that the specification and examples be considered as exemplary only, with a true scope being indicated by the following claims and their equivalents.

What is claimed is:

1. An articulating hood assembly, comprising:
a stationary sealing element having a left side, a right side and a cross member between the left and right sides, the stationary sealing element having a substantially continuous sealing surface;
an articulating hood for mating with the substantially continuous sealing surface of the stationary sealing element, the articulating hood comprising at least two hoods, wherein at least a portion of the articulating hood is moveable in a first direction from the stationary sealing element to an open position and wherein a second portion of the articulating hood is moveable in a second direction from the stationary sealing element; and
a sealing baffle fixed to the articulating hood, wherein a seal is broken and formed between the stationary sealing element and the sealing baffle of the articulating hood when: 1) at least the portion of the articulating hood is moved and returned in the first direction; and 2) the second portion of the articulating hood is moved and returned in the second direction,
wherein when the sealing baffle is in a closed position, the stationary sealing element forms a substantially continuous seal at an interface between the stationary sealing element and the sealing baffle.

2. The articulating hood assembly of claim 1, wherein the sealing baffle includes a stiffer portion for fixing to the articulating hood and a more flexible portion, adhered to the stiffer portion, for mating with the stationary sealing element.

3. The articulating hood assembly of claim 2, wherein the more flexible portion includes a channel for adhering to a protrusion of the stiffer portion.

4. The articulating hood assembly of claim 2, wherein the more flexible portion includes a primary seal and a secondary seal.

5. The articulating hood assembly of claim 1, wherein a top portion of the sealing baffle disengages first during movement of the articulating hood in the first direction and a bottom portion of the sealing baffle disengages first during movement of the articulating hood in the second direction.

6. The articulating hood assembly of claim 1, wherein the sealing baffle comprises a series of convolutions for assembly to the articulating hood on a first side of the sealing baffle away from a second side for mating with the sealing element, the series of convolutions fitting into mating portions of the articulating hood.

7. The articulating hood assembly of claim 1, further comprising an engine compartment mounting the articulating hood assembly and a vehicle, the vehicle further including a frame, an engine, a cooling package, wheels and an operator cab.

8. A articulating hood assembly, comprising:
an engine compartment comprising a stationary sealing element, the stationary sealing element having a substantially continuous surface;
an articulating hood mounted to the engine compartment for mating with the stationary sealing element, the articulating hood comprising at least two hoods, wherein at least a first portion of the articulating hood is moveable in a first direction from the stationary sealing element to an open position and wherein at least a second portion of the articulating hood is moveable in a second direction from the stationary sealing element; and
a sealing baffle fixed to the articulating hood, wherein a seal is broken and formed between the stationary sealing element and the sealing baffle of the articulating hood when: 1) at least the first portion of the articulating hood is rotated and returned in a first direction; and 2) at least the second portion of the articulating hood is rotated and returned in a second direction,
wherein when the sealing baffle is in a closed position, the stationary sealing element forms a substantially continuous seal at an interface between the stationary sealing element and the sealing baffle.

9. The articulating hood assembly of claim 8, wherein the sealing baffle includes a stiffer fiberglass portion for fixing to the articulating hood and a more flexible elastomeric portion for mating with the stationary sealing element.

10. The articulating hood assembly of claim 8, wherein the stationary sealing element comprises a left side, a right side and a cross member between the left and right sides.

11. The articulating hood assembly of claim 10, wherein at least portions of surfaces of the left and right side sealing elements are at an upward facing angle with respect to a vertical orientation defined by a radiator in the engine compartment.

12. The articulating hood assembly of claim 8, wherein the articulating hood includes a radiator hood mounted to the engine compartment with a first hinge.

13. The articulating hood assembly of claim 8, wherein the articulating hood includes an engine hood mounted to the articulating hood with a second hinge.

14. The articulating hood assembly of claim 8, wherein the seal is broken and formed by rotation in a plane in the first direction using a first pivot point and by rotation in the same plane in the second direction using a second pivot point.

15. The articulating hood assembly of claim 8, wherein engagement between the sealing element and the sealing baffle is identical after movement in the first direction and after movement in the second direction.

16. A articulating hood assembly, comprising:
an engine compartment comprising a stationary sealing element having a left side, a right side and a cross member between the left and right sides, the stationary sealing element having a substantially continuous top surface in which at least portions of surfaces of the stationary sealing element on opposite sides of the engine compartment lie in a same plane;
an articulating hood mounted to the engine compartment for mating with the stationary sealing element, the articulating hood comprising a radiator hood and an engine hood, wherein at least the radiator hood is rotatable in a first direction from the stationary sealing element to an open position and wherein at least the engine hood is rotatable in a second direction from the stationary sealing element; and a sealing baffle fixed to the radiator hood, wherein a seal is broken and formed between the stationary sealing element and the sealing baffle of the radiator hood when:
1) at least the radiator hood is rotated and returned in a first direction; and 2) at least the engine hood is rotated and returned in a second direction, wherein the sealing baffle includes a stiffer portion for fixing to the articulating hood and a more flexible portion joined to the stiffer portion for mating with the stationary sealing element,
wherein when the sealing baffle is in a closed position, the stationary sealing element forms a substantially continuous seal at an interface between the stationary sealing element and the sealing baffle.

17. The articulating hood assembly of claim 16, wherein the more flexible portion comprises a first elastomeric seal and a second elastomeric seal adjacent the first elastomeric seal.

18. The articulating hood assembly of claim 16, wherein the sealing baffle comprises a plurality of manufactured pieces joined to form a single-piece sealing baffle.

19. The articulating hood assembly of claim 16, wherein the stiffer portion of the sealing baffle includes a plurality of fiberglass lengths joined together to form a single-piece sealing baffle and wherein the more flexible portion comprises an elastomeric seal adhesively adhered to the plurality of fiberglass lengths.

20. The articulating hood assembly of claim 16, wherein the sealing baffle further includes a bottom elastomeric piece for sealing against a floor of the engine compartment.

* * * * *